United States Patent
Heinrich et al.

(10) Patent No.: US 9,131,445 B2
(45) Date of Patent: Sep. 8, 2015

(54) LOW POWER MODE EXIT LATENCY PREDICTOR FOR REAL-TIME ASYMMETRIC MULTIPROCESSOR SYSTEMS

(71) Applicant: Nvidia Corporation, Santa Clara, CA (US)

(72) Inventors: Greg Heinrich, Sophia Antipolis (FR); Robert Riglar, Bristol (GB)

(73) Assignee: NVIDIA CORPORATION, Santa Clara, CA (US)

( * ) Notice: Subject to any disclaimer, the term of this patent is extended or adjusted under 35 U.S.C. 154(b) by 191 days.

(21) Appl. No.: 13/894,704

(22) Filed: May 15, 2013

(65) Prior Publication Data

US 2014/0342727 A1 Nov. 20, 2014

(51) Int. Cl.
*H04W 4/00* (2009.01)
*H04W 52/02* (2009.01)

(52) U.S. Cl.
CPC ................................. *H04W 52/0229* (2013.01)

(58) Field of Classification Search
CPC ............................ H04L 63/0853; H04W 4/008
USPC ......... 370/311, 329, 342, 328, 338, 345, 277;
455/424, 414.1, 187.1, 101, 422.1,
455/435.1, 434, 574; 340/870.07, 12.5,
340/686.6
See application file for complete search history.

(56) References Cited

U.S. PATENT DOCUMENTS

| | | | |
|---|---|---|---|
| 2008/0170526 A1* | 7/2008 | Narang et al. | 370/311 |
| 2013/0028157 A1* | 1/2013 | Ruster et al. | 370/311 |
| 2013/0329576 A1* | 12/2013 | Sinha | 370/252 |
| 2014/0129757 A1* | 5/2014 | Lo et al. | 711/103 |

* cited by examiner

*Primary Examiner* — Kiet Doan

(57) ABSTRACT

In an aspect there is provided a method of moving a processor of a mobile device from a low-power state for conserving power to an active mode for processing signals. The mobile device is configured to receive regularly scheduled signals. The method comprises, for each of multiple operating states of the mobile device determining a restore time associated with the operating state of the mobile device and storing each determined restore time in association with its operating state. The method further comprises detecting a current operating state of the mobile device and using the determined restore time for that state to set a trigger time to control movement of the processor of the mobile device to enter the active mode from the low-power mode in time to process the scheduled signals.

18 Claims, 3 Drawing Sheets

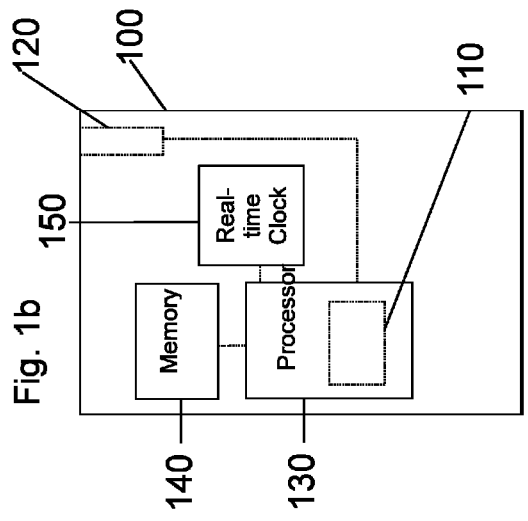
Fig. 1a
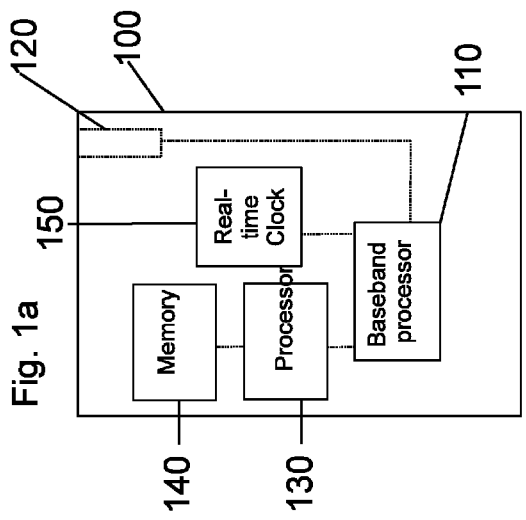
Fig. 1b
| CPU | RAT | | |
|---|---|---|---|
| | 2G (x1) | 3G (x2) | LTE (x3) |
| 1st freq. (y1) | t(x1,y1) | t(x2,y1) | t(x3,y1) |
| 2nd freq. (y2) | t(x1,y2) | t(x2,y2) | t(x3,y2) |
| 3rd freq. (y3) | t(x1,y3) | t(x2,y3) | t(x3,y3) |
| 4th freq. (y4) | t(x1,y4) | t(x2,y4) | t(x3,y4) |
Fig. 3

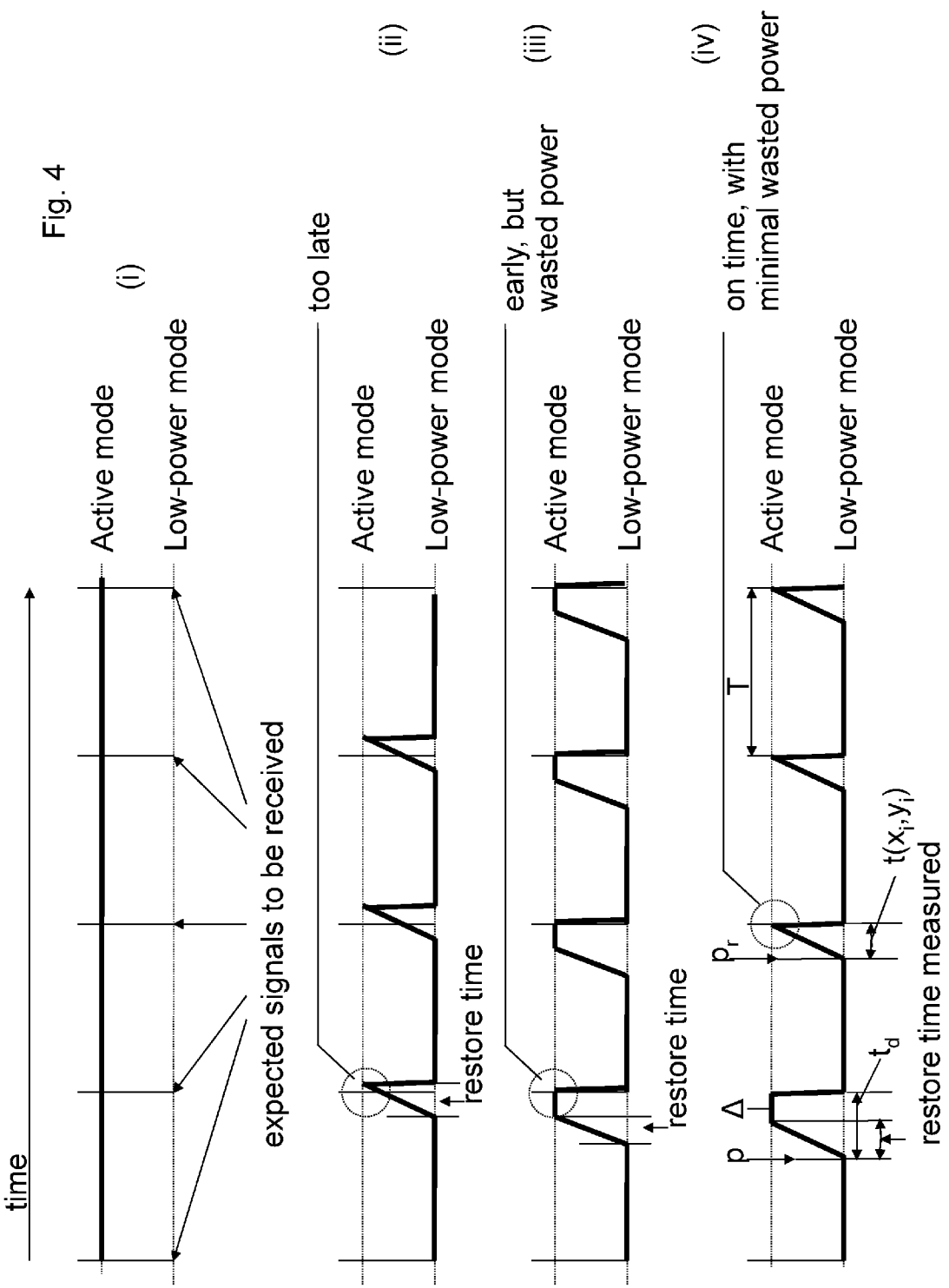

LOW POWER MODE EXIT LATENCY PREDICTOR FOR REAL-TIME ASYMMETRIC MULTIPROCESSOR SYSTEMS

TECHNICAL FIELD

This application is directed, in general, to a mobile device and, more specifically, to restoring a processor from a low power mode to an active mode in such a device.

BACKGROUND

Many mobile devices enter a low-power or 'sleep' mode when a user is not actively utilizing functions of the device. However, even if a user is not engaging with the device, the mobile device cannot perform its duties correctly while remaining constantly in a low-power mode, as it is necessary to monitor incoming signals from a network provider.

Such signals are typically scheduled to arrive at predetermined time intervals as set by network providers, e.g., between 0.5 seconds and 5 seconds. These signals are sometimes referred to as 'paging signals' and the data associated therewith are encoded as 'paging blocks'. If a mobile device is in a low power mode, it needs to "wake up" or enter an active mode, in time to handle a paging signal. Examples of these scenarios are illustrated in scenarios (i), (ii), and (iii) of FIG. 4.

FIG. 4 shows paging signals that a given mobile device is required to periodically receive and process. These signals are periodically transmitted by the network provider, typically wirelessly, for a short burst of just a few microseconds. The mobile device would typically have a baseband processor for processing these signals, and the processor must be in a suitable state for receiving and processing these signals at the time such a signal reaches the mobile device.

Scenario (i) of FIG. 4 shows the regular intervals at which a mobile device can expect to receive incoming signals, and also illustrates the low-power and active modes of the baseband processor.

As shown in scenario (i), if the baseband processor remains fully active even when other features of the mobile device are in a low-power mode, then this will ensure that the paging signal is successfully received and decoded at each of the times when the paging signal is expected. However, it will be appreciated that the microsecond time duration of the incoming signal relative to the seconds between these signals being received constitutes a long idle period where the processor is consuming power but not being utilized.

In between paging signals/activities, it is therefore preferable for the processor to enter a low-power mode (often referred to as 'sleep mode') in order to save power. However, due to the fact that the state of the system needs to be restored after being in the low-power/sleep mode, there is an issue of latency that needs to be addressed. This latency time required to restore the state of the system is referred to as 'restore time'.

It can be difficult to accurately identify a restore time for a given mobile device, not least because, depending on current state of the device, it may take a different duration to come out of the low-power mode to the active mode.

As is illustrated in scenario (ii) of FIG. 4, if the baseband processor is not in a suitable state for processing the paging signal when the paging signal arrives, then this can cause loss of data, e.g., text messages or phone calls.

Alternatively, as shown in Figure (iii), the baseband processor may be moved to the active mode early to ensure reception of the signals, but this results in wasted power.

SUMMARY

One aspect provides a mobile device for receiving regularly scheduled signals. The mobile device comprises at least one processor, a restore time determination function, a memory, and a state detection function. The at least one processor has an active mode for processing the signals and a low-power mode for conserving power. The processor is operable in one of multiple states. A restore time for entering the active mode from the low-power mode depends on a current state of operation. The restore time determination function is configured to determine a restore time for each of the multiple states. The memory holds each determined restore time in association with its associated state. The state detection function detects a current state. In operation of the mobile device the current state is detected and the restore time determined for the current state of the processor is used to control the processor to enter the active mode from the low-power mode for processing the scheduled signals.

In another aspect there is provided a method of moving a processor of a mobile device from a low-power state for conserving power to an active mode for processing signals. The mobile device is configured to receive regularly scheduled signals. The method comprises, for each of multiple operating states of the mobile device determining a restore time associated with the operating state of the mobile device and storing each determined restore time in association with its operating state. The method further comprises detecting a current operating state of the mobile device and using the determined restore time for that state to set a trigger time to control movement of the processor of the mobile device to enter the active mode from the low-power mode in time to process the scheduled signals.

In yet another aspect there is provided a computer program product comprising code embodied on a non-transitory computer-readable storage medium. The code, when executed on a processor of the mobile device, is configured to move the processor of the mobile device from a low-power state for conserving power to an active mode for processing signals. The mobile device is configured to receive regularly scheduled signals. The mobile device is further configured to determine, for each of multiple operating states of the mobile device, a restore time associated with the operating state of the mobile device. The mobile device is further configured to store each determined restore time in association with its operating state. The mobile device is further configured to detect a current operating state of the mobile device and use the determined restore time for that state to set a trigger time to control movement of the processor of the mobile device to enter the active mode from the low-power mode in time to process the scheduled signals.

BRIEF DESCRIPTION OF THE DRAWINGS

Reference is now made to the following descriptions taken in conjunction with the accompanying drawings, in which:

FIG. 1a and FIG. 1b show a first embodiment of a mobile device according to the present disclosure;

FIG. 3 shows a matrix for storing restore times associated with particular device states; and FIG. 4 shows example scenarios of mobile devices being moved from a low-power mode to an active mode for processing expected signals.

DETAILED DESCRIPTION

Figure 2:
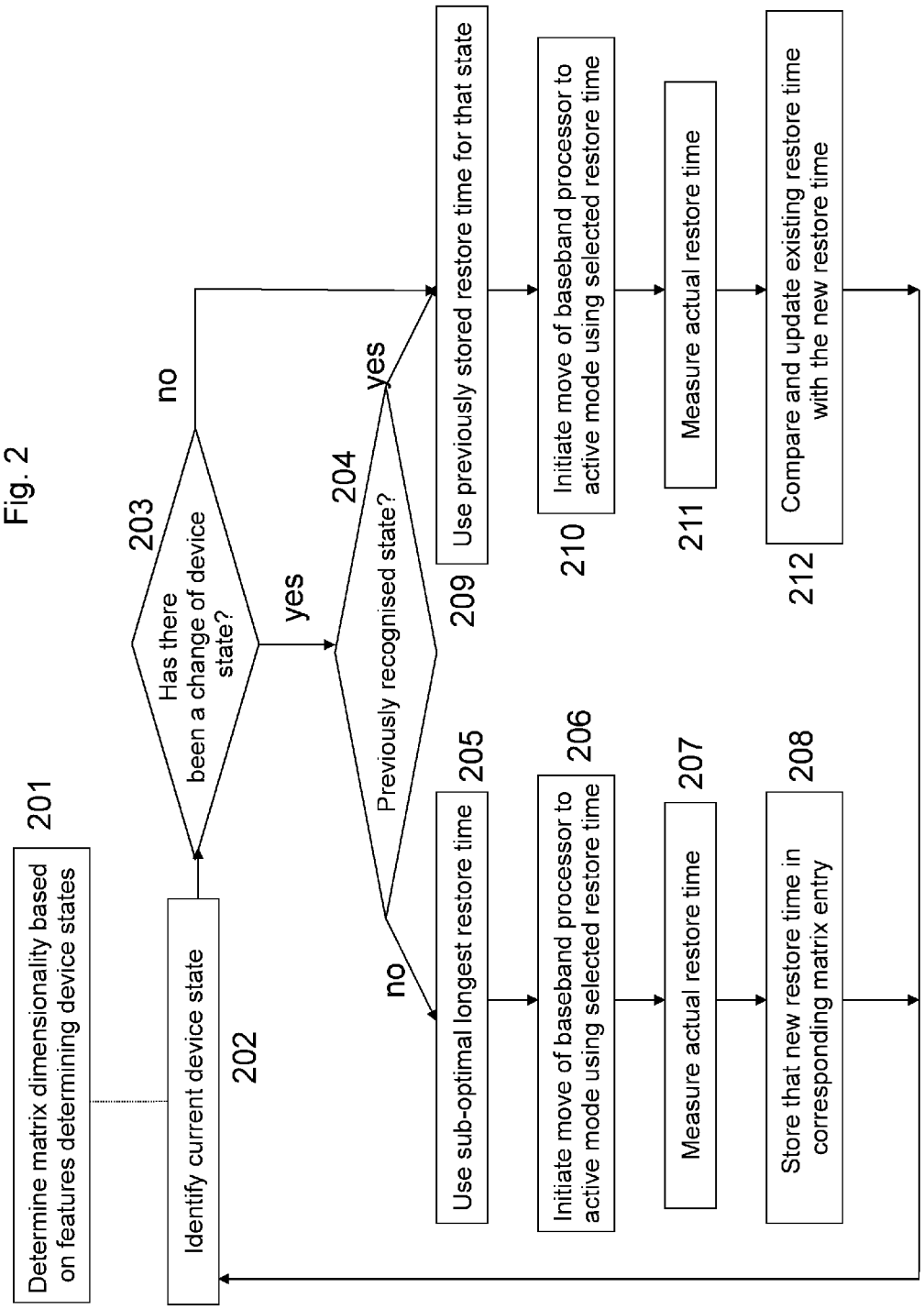
FIG. 2 shows a flow diagram according to a method according to the present disclosure.

It is therefore an object of at least one embodiment described herein to optimize power consumption of such devices without missing paging data or other regularly schedule signals.

The following described embodiments are directed to a method of operating a mobile device in which a processor is controlled to move from a lower power mode to an active mode in time to process regularly scheduled signals. A restore time is utilized to determine a trigger point in advance of an expected scheduled signal, the trigger points selected sufficiently far in advance to allow the processor to fully "wake up", based on the restore time.

As identified in the background section, it can be difficult to establish the exact actual restore time that it takes to move a processor of a mobile device into an active mode to process signals. This is because of the number of different features that can affect the restore time, and the various values such features can take can vary significantly from device to device and with changing state of the device. It is therefore advantageous to be able to develop a scheme for a system that can learn, according to the current state, how long it is taking for a given device or system to come out of a low-power mode to an active mode when in a given device state.

One way to more accurately determine the restore time to move the baseband processor from the low-power mode to the active mode, is to learn to predict the restore time as a function of the current state of the mobile device. The current state is dependent on at least some of various features of a given mobile device, and is also dependent on the value that each of those features have adopted in each particular state of the device.

While the number of features that different devices might have can seem to present difficulties, the distribution of the current state of any device is essentially a problem with variables that are selected from a discrete number of possible states. For example, though processor speed can vary significantly from device to device, even processor speed is picked from a finite set of frequencies corresponding to integer phase-locked loop (PLL) divisors. As such, all features can be pinned down to a number of features in a discrete number of states, and so the restore time can be determined more accurately as a function of the current state of the device.

In most cases, a mobile device will switch from lower power mode to active mode, process a receive signal, and then return to lower power mode. This will be repeated each time a scheduled signal is expected to be received. If the restore time can be predicted, it can be used while the processor is in the active mode to set a trigger point for the subsequent wake-up operation while the device is in the same state. The trigger point can be set by recording an expected time stamp in a time stamp register for example. The device is capable of comparing a current time (for example, using a real time clock) with the time stamp and when there is a match controlling the processor to move from the lower power mode to the active mode.

We will now describe a first embodiment of the present disclosure with reference to FIGS. 1a and 1b, and FIG. 2.

FIG. 1a schematically illustrates a mobile device 100 comprising a baseband processor 110, and wireless antenna 120.

The mobile device 100 as shown between FIGS. 1a, 1b, and 2 also comprises common mobile device features such as a general CPU 130, memory 140 (having both volatile and non-volatile parts—not shown), a power source (not shown), and a user interface (not shown) for control of the device, etc. The general CPU 130 together with the solid-state memory 140 are configured to co-operatively store and run particular operating system and associated software, as well as control operation of the various features of the device 100.

The device 100 also comprises a Real Time Clock (RTC—150) which is clocked and powered from an always-on domain in the mobile device 100 to ensure accurate timing.

The baseband processor 110 and antenna 120 are housed within the mobile device 100 and electrically connected to one another to allow the baseband processor to receive signals via the antenna for processing. In FIG. 1a the baseband processor 110 is discrete and separate from the processor 130, however, FIG. 1b also shows a variation of this embodiment where the processor 130 and baseband processor 110 are integrated with one another, e.g., both the baseband processor 110 and general purpose CPU 130 are still distinct blocks running distinct software and entering their own respective low power states, but they are physically integrated into a single package. It will be appreciated that the advantages of the present disclosure apply to both such variations of this embodiment.

The baseband processor 110 has both a low-power mode in which it conserves power and has limited processing functionality, and an active mode in which it is able to process signals received from the antenna 120. The CPU 130 is configured, together with the memory 140, to control movement of the baseband processor 110 between the respective modes. The solid-state memory 140 can be a non-transitory computer-readable storage medium arranged so as to, when executed on general CPU 130, control movement of the baseband processor between the respective modes. Other features of the device 100 also have corresponding low-power modes for conserving power and active modes for providing their respective operations.

The CPU 130 and memory 140 of the device 100 are together configured to perform a restore time determination function, as the restore time that it takes for the baseband processor 110 to move from the low-power mode to the active mode needs to be determined to control this movement between the modes.

As stated above, the restore time is a function of the current state of the device, which in turn depends on the various features of the device. In this case, the restore time determination function is responsible for determining and storing a restore time for each state of operation of the device. The function determines an n-dimensional matrix, where n is the number of features being considered to specify the current state. A method of operating the device will now be described with reference to FIG. 2.

Firstly, the dimensionality, i.e., how many dimensions the matrix must have to take account of all the relevant features, needs to determined (step 201) before the method of using such restore times can be used.

The restore time can vary according to many different factors, including (but not limited to):

(1) the particular version of firmware being used, as any change in the code that runs during state restore of a device may potentially affect restore time;

(2) the current Radio Access Technology (RAT, such as 2G, 3G, LTE, etc.), as this mainly affects the amount of internal memory to be restored after emerging from low-power/sleep mode (by way of example, the difference between restore times for 2G and LTE RAT technology can span an interval in the range of hundreds of microseconds); and (3) the current processor speed, as even if the effort to restore the state of the system mainly involves I/O operations, the processor speed affects restore time significantly.

In this embodiment, the mobile device 100 is configured to determine the matrix dimensionality based on the:

current Radio Access Technology (RAT, such as 2G, 3G or LTE, etc.); and

CPU (central processing unit) frequency divisor (which is a determinant of processor speed).

These two features/feature groups have been found to be quite significant in affecting restore time over different current states of the device. By pre-selecting such features, it helps to reduce computational complexity and the need to determine dimensionality in every case, whilst also achieving a more accurate restore time based on more significant features. Other features can also be pre-selected in other embodiments.

Therefore, in this example, the dimensionality of the matrix is n=2, This is illustrated in FIG. 3.

FIG. 3 shows a 2 dimensional matrix taking account of the different RAT modes that could be adopted by the device 100, and different CPU frequency divisor values. Once this matrix has been generated, this allows restore times corresponding to particular states to be entered into the matrix, e.g., the restore time, $t(x_i, y_i)$, (which is a function of the state $(x_i, y_i)$ will be measured when the device is in state $(x_i, y_i)$ and entered into the corresponding matrix entry.

Once the dimensionality of the matrix is determined, the device 100 can operate as normal in accordance with the present embodiment.

Firstly, the current state of the device must be identified (step 202). In this case, it is assumed that the device 100 has entered a new state, i.e., from a fresh start-up, or having moved from one state to a new previously unrecognized state. It is necessary to determine whether the current state has changed (step 203)—in this case the answer is 'yes'—and this leads to determining whether the current state is a previously recognized state (step 204)—and in this case the answer is 'no'.

As a result, the restore time associated with that new unrecognized state must be measured so as to populate that corresponding matrix entry with the associated restore time.

In this embodiment, the mobile device 100 uses a default restore time (e.g., much longer than the actual restore time is likely to be) which in this case is the longest restore time previously recorded (step 205). For example, a typical restore time may be 10 ms or less in a device, so setting a longer restore time of 20 ms would serve as a safe default restore time, e.g., using a restore time is twice the longest restore time ever measured as a worst case scenario. This approach helps to ensure that the baseband processor would wake up sufficiently early to meet its real-time deadline, at least for when no restore time is known for a particular state. The default restore time $t_d$ is used to establish a trigger point P which is time $t_d$ ahead of the required wake-up time (see FIG. 4, scenario (iv)).

At step 206, the device 100 initiates movement of the baseband processor to the active mode using the default restore time to ensure the device 100 is in a state early enough to be ready to receive and process an incoming signal at the expected time. In most cases, the wake-up time, will in fact have occurred a time Δ in advance of the required wake-up time. The actual restore time taken $(t_d-\Delta)$ to move the device from the low-power mode to the active mode is then measured (step 207) which is done using time stamps generated by the Real Time Clock (RTC—150).

Once the restore time $t(x_i, y_i)$ is measured, the restore time is stored in the corresponding matrix entry for future use.

The next time the device enters low power mode, the process then loops back round to begin again with step 202. If the device has not changed state, step 202 will determine the device is in the same state and so step 203 will move to step 209. Step 209 selects the previously stored restore time associated with that particular state, which is then used by step 210 to trigger (at trigger point P) the baseband processor 110 to move to the active mode at an appropriate time before an incoming signal is expected to need to be received and processed by the baseband processor.

Even though the restore time has already been calculated, step 211 will measure the actual restore time again for that particular state. Step 212 then compares and updates the stored restore time in the matrix with the new measured restore time. While the variance between restore times measured for the same state has been found to be remarkably low, this serves to provide an increasingly more accurate restore time, and the data from this comparison can be used for other purposes, e.g., if the variance suddenly changes, as this is surprising behavior for restore time variance, then this can serve as an instruction/indicator for the device 100 to perform diagnostic checks on its systems.

If the device state then changes and the state is a new unrecognized state, then the left branch of FIG. 2 (steps 205-208) will be used to then populate that matrix entry point.

In this example, the restore time is always measured for every state every time the method repeats itself, regardless of whether the restore time has already been measured before for that state. It will be appreciated that, due to the low variance of restore times for a single state, this need not always be the case should the restore time already be known for that state.

In order to cater for the fact that the baseband processor 110 integrates several processing cores (which may run independently and/or asymmetrically from one another), the method described above is performed for each core, and the restore time stored in the matrix is the maximum of all the restore times measured for each of the cores to ensure that the baseband processor 110 is moved toward the active mode early enough to enable it to be fully ready to receive and process the incoming signal.

Once the matrix has been determined and populated with restore times associated with particular states, these times can then be used to control movement of the baseband processor 110 from the low-power mode to the active mode.

In this embodiment, the restore time matrix is not stored in non-volatile memory. This is because learning is very fast and the state of the system tends to stay the same over time (e.g., changing mainly based on any RAT change or CPU frequency change, which are rather infrequent events). As such there is little computational burden to recalculate on start-up for different devices, and therefore it is not necessary to store the matrix in non-volatile memory and take up valuable space in non-volatile memory.

It should be pointed out that, on start-up, it is not necessary to force the device into every possible state in order to populate the matrix. Instead, it is advantageous simply to wait until the device organically moves to each particular state, and then measure the restore time associated with each state.

In another example, a larger matrix can be generated and used by, for example, using a clustering algorithm to cover all possible states, identify various features that affect the restore time, and gradually increase the number of clusters (and therefore size of the matrix) until the standard deviation or span of each cluster falls below an arbitrary restore time threshold (e.g., 50 μs). In effect, the matrix would be increased one dimension at a time until the time variation that a particular additional dimension would introduce is not sufficient to warrant keeping that dimension in the matrix.

Scenario (iv) of FIG. 4 illustrates how the above described embodiment would be advantageous over other ways of ensuring the baseband processor 110 is ready to receive incoming signals.

In this scenario, paging signals are arriving every period, T. The duration of T is on the order of seconds, which means that the microsecond duration of the signals themselves is negligible for the purposes of this illustration.

As per the description above, the device 100 is operating on the principle that the dimensionality of the matrix is governed by the current RAT and CPU divisor, the dimensionality is of order n=2.

For the very first paging block in this current state, the device 100 moves the baseband processor 110 from the low-power mode to the active mode in plenty of time for the first paging block, i.e., using the default restore time $t_d$ described above. This ensures the first signal is successfully received and processed by the baseband processor 110.

The time difference between the start and end of movement from the low-power mode to the active mode ($t_d$-$\Delta$) is measured using the time stamps from the RTC. This then gives an accurate indication of restore time $t(x_i, y_i)$ for that state, which then populates that entry in the matrix, and is subsequently used to initiate movement of the baseband processor from the low-power mode to the active mode for the further expected signals while the processor remains in that state.

In effect, to ensure that a paging block can be decoded the baseband needs to subtract the expected restore time from the time stamp at which the next paging signal is expected, and initiate movement of the baseband processor 110 at that calculated time (trigger point).

If the device 100 changes state, e.g., moves from 2G to 3G RAT, then the process will repeat itself for that new current state.

In essence, to achieve optimal power conservation the baseband processor needs to be active as late as possible while still being able to decode the paging block. This requires the accurate determination of the restore time described above.

The above described embodiment allows the device to take account of the current state of the mobile device, all processing cores and number of operations required for a state to restore to help reduce the variance of restore time and also reduce the need for a guard time when programming the RTC time (setting the timestamp) before entering sleep (low-power) mode.

One or more of these embodiments relate to 3GPP technology standards.

Those skilled in the art to which this application relates will appreciate that other and further additions, deletions, substitutions and modifications may be made to the described embodiments.

What is claimed is:

1. A mobile device for receiving regularly scheduled signals, the mobile device comprising:
   at least one processor having an active mode for processing the signals and a low-power mode for conserving power, wherein the processor is operable in one of multiple states and wherein in a restore time for entering the active mode from the low-power mode depends on a current state of operation;
   a restore time determination function configured to determine a restore time for each of the multiple states;
   a memory holding each determined restore time in association with its associated state; and
   a state detection function for detecting a current state, whereby in operation of the mobile device the current state is detected and the restore time determined for the current state of operation of the processor is used to control the processor to enter the active mode from the low-power mode for processing the scheduled signals.

2. The mobile device of claim 1, wherein the signals comprise one or more paging blocks, the paging blocks being regularly scheduled to be received at a predetermined time interval.

3. The mobile device of claim 1, which is a wireless mobile device for receiving RF signals, wherein the at least one processor is a baseband processor for processing the RF signals.

4. The mobile device of claim 1, wherein the at least one processor comprises multiple processor cores, and the restore time determination function is operable to determine a maximum restore time amongst the processor cores for each state.

5. The mobile device according to claim 1, wherein the memory comprises a matrix with each dimension of the matrix defining a feature of a state with variable parameters for that feature, and wherein each determined restore time is located in a matrix entry defined by a set of features for that state.

6. The mobile device of claim 5, wherein the features for the current state include at least one of:
   radio access technology (RAT), processor speed, and/or firmware version.

7. The mobile device of claim 1, wherein the restore time determination function comprises a timer for measuring an actual restore time from the lower power mode to the active mode for the current state.

8. The mobile device of claim 1, comprising a trigger time set function operable to set a trigger time to control movement of the processor from the lower power mode to the active mode, wherein a first trigger time is determined using a default restore time and a subsequent trigger time is determined using a determined restore time for the current state.

9. A method of moving a processor of a mobile device from a low-power state for conserving power to an active mode for processing signals, the mobile device configured to receive regularly scheduled signals, the method comprising:
   for each of multiple operating states of the mobile device, determining a restore time associated with the operating state of the mobile device, storing each determined restore time in association with its operating state; and
   detecting a current operating state of the mobile device and using the determined restore time for that state to set a trigger time to control movement of the processor of the mobile device to enter the active mode from the low-power mode in time to process the scheduled signals.

10. The method of claim 9, wherein the method comprises:
    on entry into the low power mode, identifying whether the current operating state has changed;
    determining, if the current state has changed to a new state, whether the new current state has a restore time already associated therewith;
    if the new current state does not have a restore time already associated therewith, using a default restore time for initially setting the trigger time;
    measuring the actual restore time of that new current state;
    storing that actual restore time of that new current state in the corresponding matrix entry associated with that current state.

11. The method of claim 9, wherein the method comprises, each time the processor is moved from the lower power mode to the active mode, determining a new restore time for a current state of the mobile device;
    comparing the new restore time with an existing restore time stored for that state; and
    updating the stored restore time based on said comparison.

12. The method of claim 11, wherein the method comprises:
    performing a recovery operation in the event a comparison between a repeat determination of the restore time and the existing stored restore time do not satisfy predetermined variance conditions.

13. The method of claim 9, comprising the step of generating a matrix, wherein each dimension of the matrix provides a feature for an operating state defined by a variable parameters for that feature, wherein the step of storing each determined restore time in association with its operating state comprises entering the determined restore time in a matrix entry determined by the variable parameters of the features defining that state.

14. A computer program product comprising code embodied on a non-transitory computer-readable medium and configured so as to, when executed on a processor of a mobile device, move the processor of the mobile device from a low-power state for conserving power to an active mode for processing signals, the mobile device being configured to receive regularly scheduled signals, and further configured to:
    for each of multiple operating states of the mobile device, determine a restore time associated with the operating state of the mobile device;
    store each determined restore time in association with its operating state; and
    detect a current operating state of the mobile device and use the determined restore time for that state to set a trigger time to control movement of the processor of the mobile device to enter the active mode from the low-power mode in time to process the scheduled signals.

15. The computer program product of claim 14, wherein the code is configured so as when executed to:
    on entry into the low power mode, identify whether the current operating state has changed;
    determine, if the current state has changed to a new state, whether the new current state has a restore time already associated therewith;
    if the new current state does not have a restore time already associated therewith, use a default restore time for initially setting the trigger time;
    measure the actual restore time of that new current state; and
    store that actual restore time of that new current state in the corresponding matrix entry associated with that current state.

16. The computer program product of claim 14, wherein the code is configured so as when executed to:
    each time the processor is moved from the lower power mode to the active mode, determine a new restore time for a current state of the mobile device;
    compare the new restore time with an existing restore time stored for that state; and
    update the stored restore time based on said comparison.

17. The computer program product of claim 16, wherein the code is configured so as when executed to:
    perform a recovery operation in the event a comparison between a repeat determination of the restore time and the existing stored restore time do not satisfy predetermined variance conditions.

18. The computer program product of claim 14, wherein the code is configured so as when executed to generate a matrix, wherein each dimension of the matrix provides a feature for an operating state defined by a variable parameters for that feature, wherein the step of storing each determined restore time in association with its operating state comprises entering the determined restore time in a matrix entry determined by the variable parameters of the features defining that state.

* * * * *